(12) United States Patent
Homma

(10) Patent No.: US 12,744,436 B2
(45) Date of Patent: Sep. 22, 2026

(54) METHOD FOR MANUFACTURING ROTOR AND ROTOR

(71) Applicant: TOYOTA BOSHOKU KABUSHIKI KAISHA, Aichi-ken (JP)

(72) Inventor: Daisuke Homma, Anjo (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 158 days.

(21) Appl. No.: 18/648,609

(22) Filed: Apr. 29, 2024

(65) Prior Publication Data

US 2024/0380292 A1 Nov. 14, 2024

(30) Foreign Application Priority Data

May 9, 2023 (JP) ................................ 2023-077124

(51) Int. Cl.
*H02K 15/12* (2025.01)
*H02K 1/276* (2022.01)
*H02K 15/03* (2006.01)

(52) U.S. Cl.
CPC ............. *H02K 15/12* (2013.01); *H02K 1/276* (2013.01); *H02K 15/03* (2013.01)

(58) Field of Classification Search
CPC ......... H02K 15/12; H02K 1/276; H02K 15/03
See application file for complete search history.

(56) References Cited

U.S. PATENT DOCUMENTS

2019/0047189 A1* 2/2019 Nishida .................. B29C 45/13

FOREIGN PATENT DOCUMENTS

JP 2007049805 * 2/2007 ............ H02K 15/03
JP 2019-140841 8/2019

* cited by examiner

*Primary Examiner* — Terrance L Kenerly
(74) *Attorney, Agent, or Firm* — Greenblum & Bernstein, P.L.C.

(57) ABSTRACT

A method for manufacturing a rotor includes preparing magnets and a core including magnet housing holes. Each magnet housing holes including an elongated hole portion. The elongated hole portion and the magnet are configured such that a difference between a dimension in a width direction of the elongated hole portion and a dimension in the width direction of the magnet when accommodated in the elongated hole portion is greater than 0 and less than or equal to 0.45 mm. The method further includes accommodating the magnets in the elongated hole portions of the magnet housing holes, clamping the core between a first die and a second die in a state in which the magnets are accommodated in the elongated hole portions of the magnet housing holes, and injecting the thermoplastic into the magnet housing holes of the core clamped between the first die and the second die.

5 Claims, 5 Drawing Sheets

21
32
23
33
22
25
24
26
27
13
12
12
12
35
37
15 (19)
17
20
31
36
14
C
34
28
30
Z

METHOD FOR MANUFACTURING ROTOR AND ROTOR

CROSS-REFERENCE TO RELATED APPLICATIONS

This application is based upon and claims the benefit of priority from prior Japanese Patent Application No. 2023-077124, filed on May 9, 2023, the entire contents of which are incorporated herein by reference.

BACKGROUND

1. Field

The present disclosure relates to a method for manufacturing a rotor of a magnet-embedded motor and to a rotor.

2. Description of Related Art

The rotor of a magnet-embedded motor includes a core formed by stacking iron core pieces. The core includes magnet housing holes extending through the core in the stacking direction of the iron core pieces. A magnet is fixed in each of the magnet housing holes by filling the magnet housing hole with plastic with the magnet accommodated in the magnet housing holes.

For example, Japanese Laid-Open Patent Publication No. 2019-140841 discloses a method for manufacturing such a rotor. A manufacturing apparatus for manufacturing a rotor disclosed in the publication includes a first die and a second die, which are arranged to face each other with a core located between the first die and the second die. The first die includes a die body and a support member that supports the core. The second die includes a die body and a cull plate having filling pots for filling magnet housing holes with plastic.

When manufacturing a rotor, a cull plate is first attached to the core, which is supported by the support member and accommodates magnets in the magnet housing holes. After the core in this state is held between the die body of the first die and the die body of the second die, the magnets are fixed by filling the magnet housing holes with plastic from the filling pots of the cull plate. The rotor is thus manufactured.

In the above-described method for manufacturing a rotor, since the magnet housing holes are completely filled with plastic, the magnets accommodated in the magnet housing holes are entirely covered with the plastic. Therefore, the magnet cannot be directly cooled by, for example, a cooling medium. Therefore, there remains room for improvement in increasing the cooling performance of the magnets in the rotor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method for manufacturing a rotor is provided. A rotor is manufactured by injecting thermoplastic into each of magnet housing holes in a core with a magnet accommodated in each magnet housing hole, thereby fixing the magnets. The method includes preparing the core and the magnets, the core including the magnet housing holes. Each of the magnet housing holes extends through the core in an axial direction of the core and includes an elongated hole portion that extends in a direction intersecting a radial direction of the core. The elongated hole portion and the magnet are configured such that a difference between a dimension in a width direction, which is a direction orthogonal to a lengthwise direction of the elongated hole portion, and a dimension, in the width direction of the magnet when accommodated in the elongated hole portion, is greater than 0 and less than or equal to 0.45 mm. The method further includes accommodating the magnets in the elongated hole portions of the magnet housing holes, clamping the core between a first die and a second die in a state in which the magnets are accommodated in the elongated hole portions of the magnet housing holes, and injecting the thermoplastic into the magnet housing holes of the core clamped between the first die and the second die.

In another general aspect, a rotor includes a core including magnet housing holes, and magnets that are fixed with thermoplastic in a state in which the magnets are respectively accommodated in the magnet housing holes. Each of the magnet housing holes extends through the core in an axial direction of the core and includes an elongated hole portion that extends in a direction intersecting a radial direction of the core. A direction orthogonal to a lengthwise direction of each elongated hole portion is defined as a width direction. Each elongated hole portion includes two inner surfaces on opposite sides in the width direction. One of the inner surfaces closer to a peripheral edge of the core is defined as a first inner surface. The other inner surface, farther from the peripheral edge of the core, is defined as a second inner surface. The magnet accommodated in each elongated hole portion includes two side surfaces on opposite sides in the width direction. One of the side surfaces closer to the peripheral edge of the core is defined as a first side surface. The other side surface, farther from the peripheral edge of the core, is defined as a second side surface. In each of the elongated hole portion, a gap is formed between the first inner surface of the elongated hole portion and the first side surface of the magnet accommodated in the elongated hole portion, or between the second inner surface of the elongated hole portion and the second side surface of the magnet accommodated in the elongated hole portion, or both between the first inner surface of the elongated hole portion and the first side surface of the magnet accommodated in the elongated hole portion and between the second inner surface of the elongated hole portion and the second side surface of the magnet accommodated in the elongated hole portion.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A method for manufacturing a rotor and a rotor according to one embodiment will now be described with reference to the drawings.

Rotor 11

Figure 1:
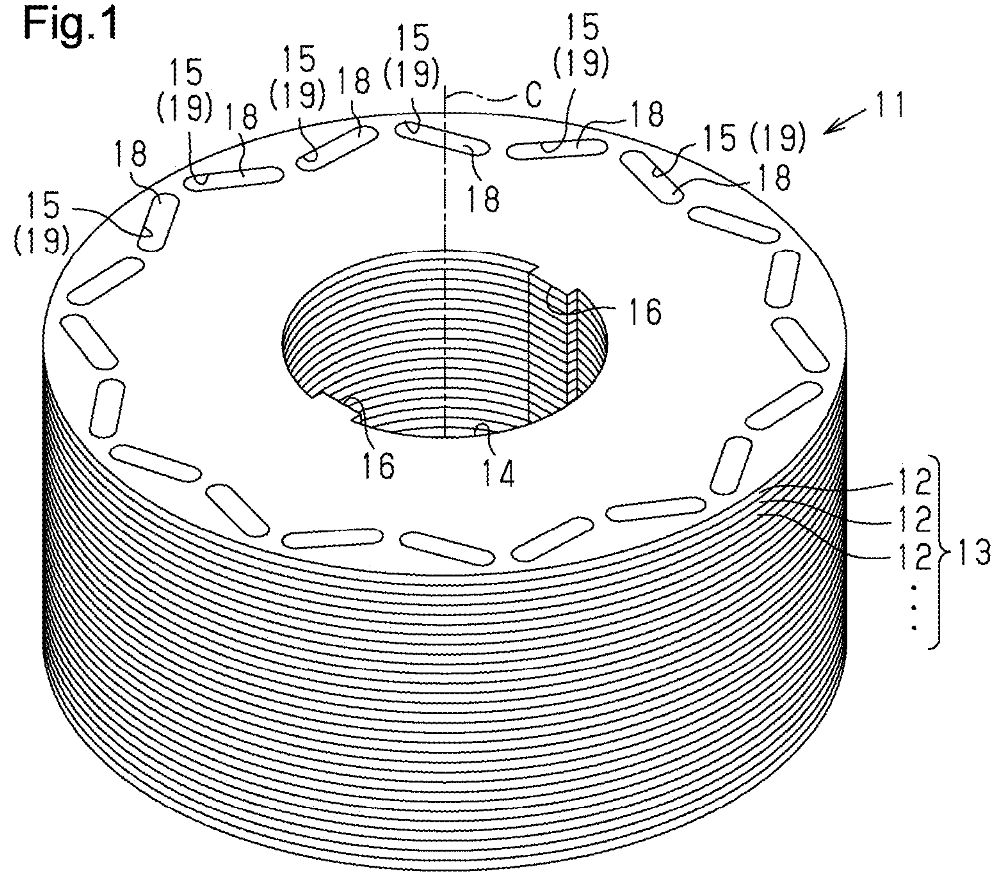
FIG. 1 is a perspective view of a rotor that is manufactured by a manufacturing method according to one embodiment.
Figure 2:
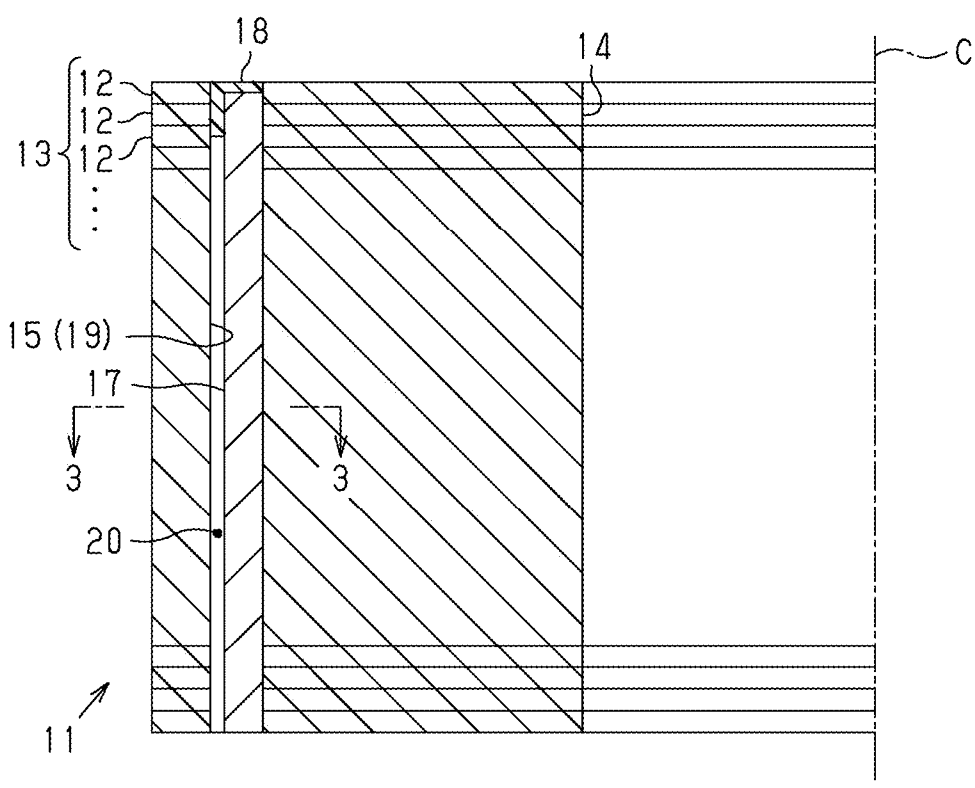
FIG. 2 is a cross-sectional view of the rotor shown in FIG. 1.

As shown in FIGS. 1 and 2, a rotor 11 includes a core 13, which is formed by stacking iron core pieces 12, which are circular magnetic steel sheets. That is, the core 13 is formed by a laminated body formed by stacking multiple iron core pieces 12. The core 13 includes a center hole 14 and multiple (twenty in the present embodiment) magnet housing holes 15. The magnet housing holes 15 are located on the radially outer side of the center hole 14 and arranged at intervals in the circumferential direction.

The center hole 14 and the magnet housing holes 15 extend through the core 13 in an extending direction of an axis C of the core 13 (axial direction). That is, the center hole 14 and the magnet housing holes 15 extend along the axis C of the core 13 while extending through the core 13. Two protrusions 16, which face each other in the radial direction of the core 13, are provided on the inner circumferential surface of the center hole 14. The protrusions 16 extend along the axis C. The shape of each magnet housing hole 15, as viewed in the extending direction of the axis C, is substantially rectangular with rounded opposite ends in the lengthwise direction.

Each magnet housing hole 15 accommodates a magnet 17. Each magnet 17 has a shape of a rectangular parallelepiped extending along the axis C. In the present embodiment, each magnet 17 is formed by attaching two permanent magnets to each other to form a rectangular parallelepiped. Each magnet 17 may be formed by a single rectangular parallelepiped permanent magnet. Plastic 18, which is thermoplastic, is disposed in each magnet housing hole 15 to fix the magnet 17. The plastic 18 is formed from, for example, polypropylene.

Magnet Housing Holes 15

Figure 3:
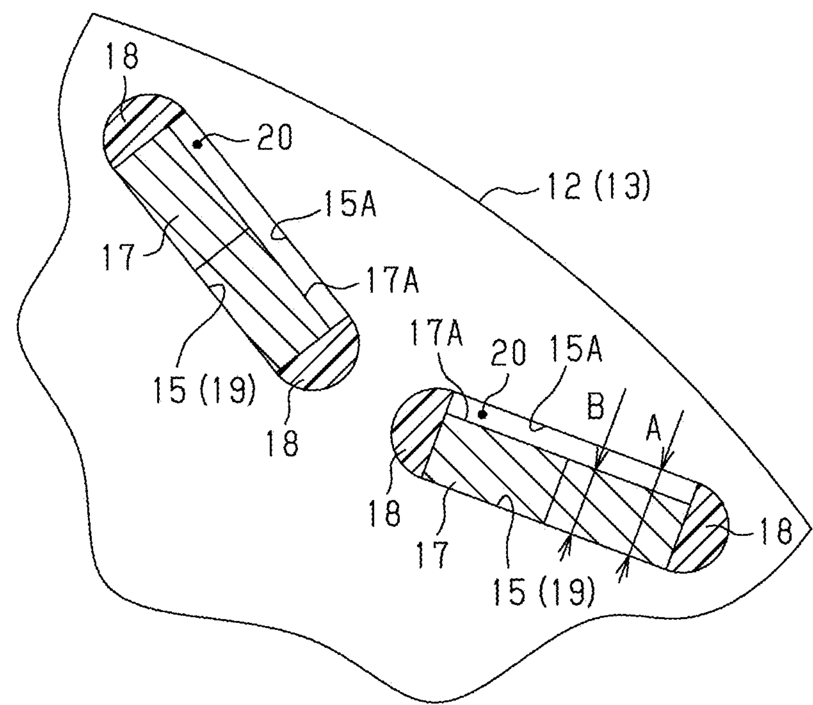
FIG. 3 is a cross-sectional view taken along line 3-3 in FIG. 2.

As shown in FIGS. 2 and 3, each magnet housing hole 15 includes an elongated hole portion 19, which extends in a direction intersecting a radial direction of the core 13 when viewed in the extending direction of the axis C. In the present embodiment, the entire magnet housing hole 15 is the elongated hole portion 19. When viewed in the extending direction of the axis C, the magnet housing hole 15 extends in a direction intersecting the radial direction of the core 13 at a specified angle (in this example, approximately 65°). That is, the magnet housing hole 15 is arranged such that its lengthwise direction intersects the radial direction of the core 13 at the specific angle when viewed in the extending direction of the axis C.

Each magnet housing hole 15 (each elongated hole portion 19) and the corresponding magnet 17 are configured such that, when viewed in the extending direction of the axis C, the difference between a dimension A in a width direction (a direction orthogonal to the lengthwise direction of the magnet housing hole 15) and a dimension B in the width direction of the magnet 17 accommodated in the magnet housing hole 15 is greater than 0 and less than or equal to 0.45 mm.

Figure 6:
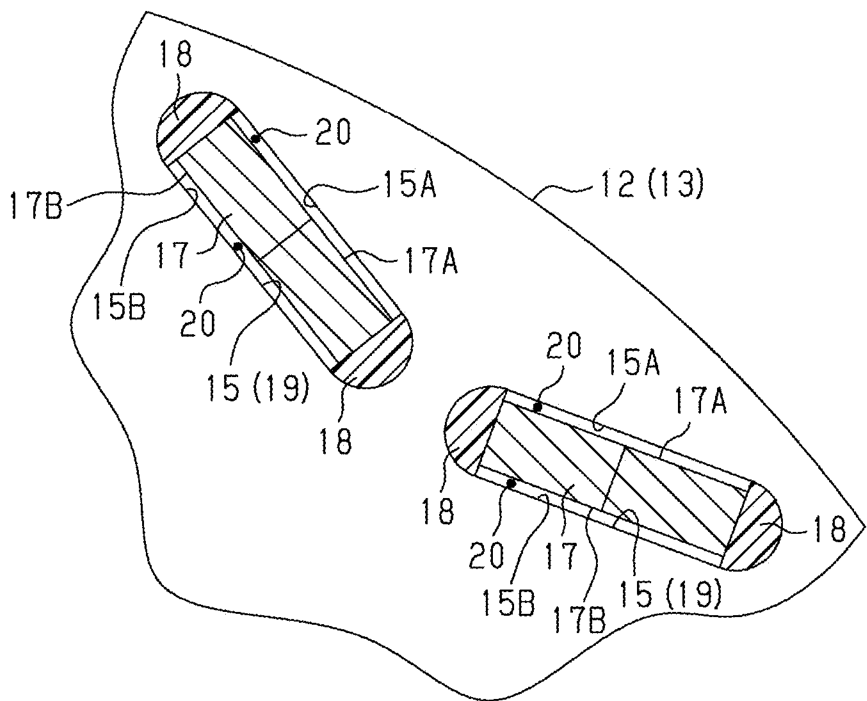
FIG. 6 is a cross-sectional view illustrating a part of a rotor according to a modification.

Each magnet housing hole 15 (elongated hole portion 19) includes two inner surfaces on the opposite sides in the width direction. One of the inner surfaces closer to a peripheral edge of the core 13 is defined as a first inner surface 15A, and the other inner surface, farther from the peripheral edge of the core 13, is defined as a second inner surface 15B (refer to FIG. 6 showing a modification). The magnet 17 accommodated in the magnet housing hole 15 (the elongated hole portion 19) includes two side surfaces on the opposite sides in the width direction. One of the side surfaces closer to the peripheral edge of the core 13 is defined as a first side surface 17A, and the other side surface, farther from the peripheral edge of the core 13, is defined as a second side surface 17B (refer to FIG. 6). In this case, due to the relationship between the dimension A and the dimension B, a gap 20 is formed between the first inner surface 15A of the magnet housing hole 15 (the elongated hole portion 19) and the first side surface 17A of the magnet 17 accommodated in the magnet housing hole 15 (the elongated hole portion 19), or between the second inner surface 15B of the magnet housing hole 15 (the elongated hole portion 19) and the second side surface 17B of the magnet 17 accommodated in the magnet housing hole 15 (the elongated hole portion 19), or both between the first inner surface 15A of the magnet housing hole 15 (the elongated hole portion 19) and the first side surface 17A of the magnet 17 accommodated in the magnet housing hole 15 (the elongated hole portion 19) and between the second inner surface 15B of the magnet housing hole 15 (the elongated hole portion 19) and the second side surface 17B of the magnet 17 accommodated in the magnet housing hole 15 (the elongated hole portion 19). In the present embodiment, the gap 20 is formed only between the first inner surface 15A of the magnet housing hole 15 (the elongated hole portion 19) and the first side surface 17A of the magnet 17, but not between the second inner surface 15B of the magnet housing hole 15 (the elongated hole portion 19) and the second side surface 17B of the magnet 17.

In other words, in the present embodiment, each magnet 17 is accommodated in the corresponding magnet housing hole 15 in a state in which the second inner surface 15B of the magnet housing hole 15 (the elongated hole portion 19) is in contact with the second side surface 17B of the magnet 17.

Manufacturing Apparatus 21 for Rotor 11

Figure 4:
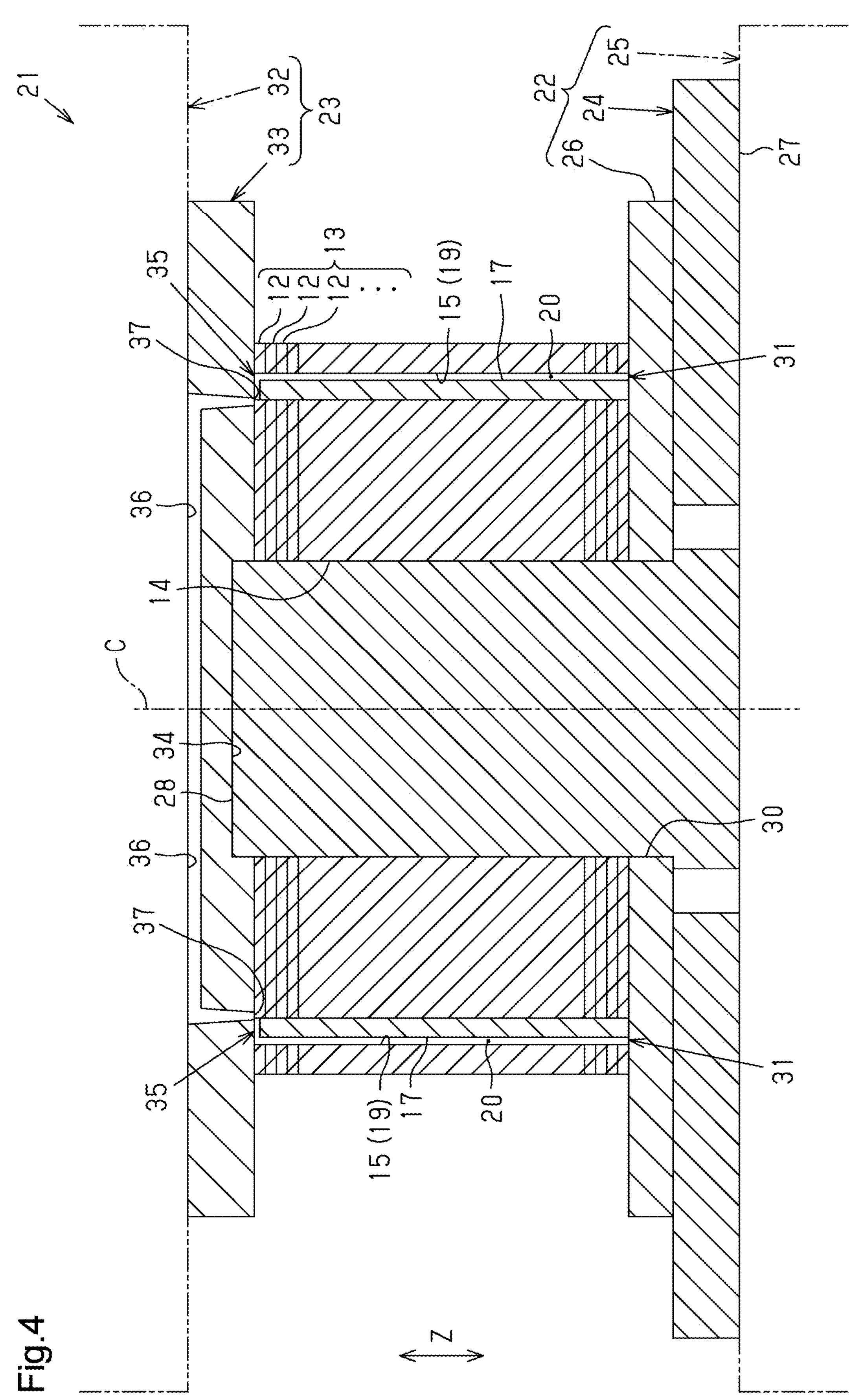
FIG. 4 is a cross-sectional view illustrating a state in which a core is clamped between the first die and the second die in a state in which the core is supported by the support member.

As shown in FIG. 4, a manufacturing apparatus 21 for the rotor 11 includes a first die 22 and a second die 23, which are arranged to face each other in the vertical direction. When manufacturing the rotor 11 with the manufacturing apparatus 21, the core 13 is arranged between the first die 22 and the second die 23 in a state in which the core 13 is supported by a support member 24, and the magnets 17 are respectively accommodated in the magnet housing holes 15. Then, the magnets 17 are fixed by injecting the plastic 18 into the respective magnet housing holes 15 to manufacture the rotor 11.

First Die 22

As shown in FIG. 4, the first die 22 includes a first die body 25, a support member 24, and a workpiece spacer 26. The first die 22 has a structure in which the support member 24 and the workpiece spacer 26 are stacked in a facing direction Z, in which the first die 22 and the second die 23 face each other. The facing direction Z agrees with the extending direction of the axis C of the core 13 arranged between the first die 22 and the second die 23.

Support Member 24

Figure 5:
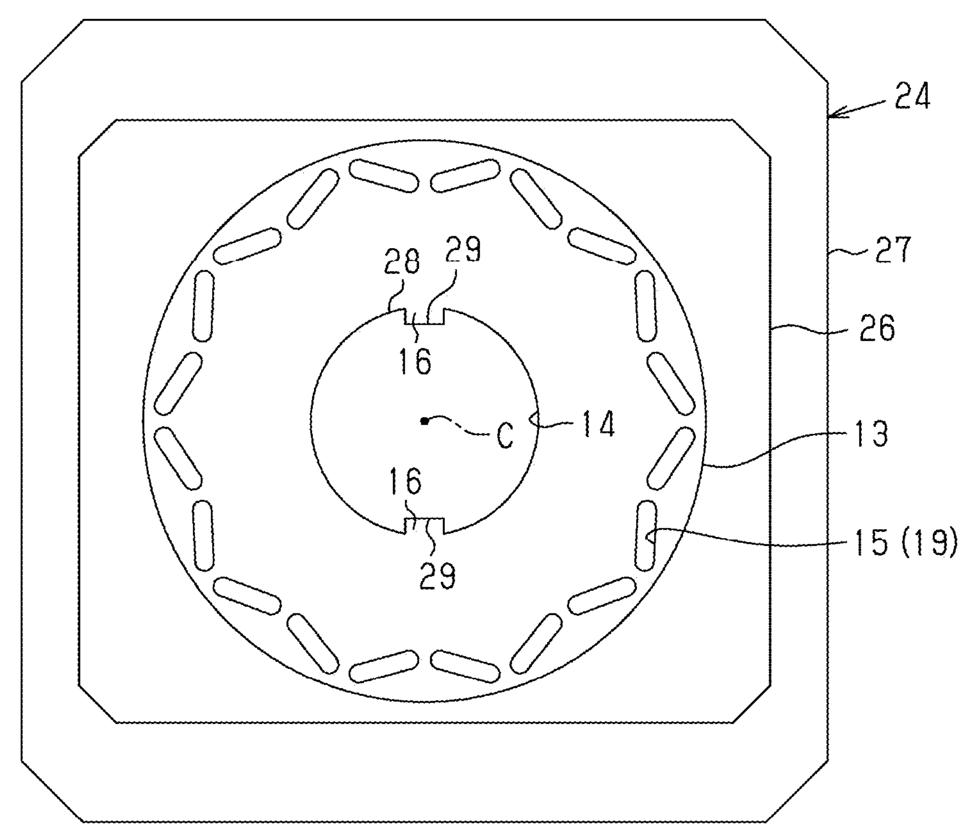
FIG. 5 is a plan view showing a state in which the core is supported by the support member.

As shown in FIGS. 4 and 5, the support member 24 is placed on the first die body 25. The support member 24 includes a base portion 27, which is substantially a rectangular plate, and a columnar post portion 28, which extends upright from a central portion of the upper surface of the base portion 27. The support member 24 supports the core 13 by inserting the post portion 28 into the center hole 14 of the core 13. The upper end of the post portion 28 protrudes upward from the upper surface of the core 13.

The lower surface of the base portion 27 is in contact with the upper surface of the first die body 25. The upper surface of the base portion 27 is in contact with the workpiece spacer 26, which is in contact with the lower surface of the core 13. The post portion 28 includes two engagement grooves 29 in the outer circumferential surface. The engagement grooves 29 extend along the axis C and are respectively engaged with the two protrusions 16 of the core 13. The two protrusions 16 of the core 13 are respectively inserted into the two engagement grooves 29 of the post portion 28 to determine the position of the core 13 in the circumferential direction in relation to the post portion 28.

Workpiece Spacer 26

As shown in FIGS. 4 and 5, the workpiece spacer 26 has the shape of a substantially rectangular plate. A circular through-hole 30 is formed in a central portion of the workpiece spacer 26 to receive the post portion 28 of the support member 24. The workpiece spacer 26 is disposed on the base portion 27 with the post portion 28 inserted into the through-hole 30. The workpiece spacer 26 is arranged such that its upper surface contacts the lower surface of the core 13 and its lower surface contacts the upper surface of the base portion 27.

The workpiece spacer 26 closes lower end openings 31 of the magnet housing holes 15 of the core 13. In a state in which the magnets 17 are inserted into the magnet housing holes 15 of the core 13, the lower surfaces of the magnets 17 contact the upper surface of the workpiece spacer 26. In this case, the lower surfaces of the magnets 17 are flush with the lower surface of the core 13.

Second Die 23

As shown in FIG. 4, the second die 23 includes a second die body 32 and a gate plate 33. The gate plate 33 is plate-shaped and is located between the second die body 32 and the core 13. A substantially circular recess 34 is formed in a central portion of the lower surface of the gate plate 33 to receive the upper end of the post portion 28.

The side surface of the recess 34 is provided with two engagement protrusions (not shown) that respectively engage with the engagement grooves 29 of the post portion 28. The two engagement protrusions (not shown) of the gate plate 33 are inserted into the two engagement grooves 29 of the post portion 28 to determine the position of the post portion 28 in the circumferential direction in relation to the gate plate 33.

The gate plate 33 is arranged on the core 13 to close upper end openings 35 of the magnet housing holes 15. The lower surface of the gate plate 33 contacts the upper surface of the core 13. The gate plate 33 includes branch passages 36, which respectively supply the plastic 18 in a molten state to the magnet housing holes 15 from a cylinder (not shown). The branch passages 36 extend radially from a central position on the axis C of the gate plate 33 so as to respectively correspond to the magnet housing holes 15. The downstream end of each branch passage 36 is an injection port 37 that faces the upper end opening 35 of the corresponding magnet housing hole 15.

Method for Manufacturing Rotor 11

The method for manufacturing the rotor 11 includes a supporting step, a magnet accommodating step, a die clamping step, an injection step, and a removal step. In the method for manufacturing the rotor 11, the core 13 and the magnets 17 are prepared prior to these steps.

Supporting Step

As shown in FIG. 4, in the supporting step, the post portion 28 of the support member 24 is inserted into the through-hole 30 of the workpiece spacer 26. Then, the post portion 28 of the support member 24 is inserted into the center hole 14 of the core 13 so that the core 13 is supported by the support member 24.

Magnet Accommodating Step

As shown in FIGS. 3 and 4, in the magnet accommodating step, the magnets 17 are inserted into the magnet housing holes 15 of the core 13, which is supported by the support member 24 in the supporting step, so that the magnets 17 are accommodated in the magnet housing holes 15. At this time, the second inner surface 15B of each magnet housing hole 15, which is on the side opposite to the peripheral edge of the core 13 in the width direction, is brought into contact with the second side surface 17B of the corresponding magnet 17, which is on the side opposite to the peripheral edge of the core 13 in the width direction. This creates the gap 20 between the first inner surface 15A of the magnet housing hole 15, which is on the side closer to the peripheral edge of the core 13 in the width direction, and the first side surface 17A of the magnet 17, which is on the side closer to the peripheral edge of the core 13 in the width direction.

Die Clamping Step

As shown in FIG. 4, in the die clamping step, the core 13 is arranged between the first die 22 and the second die 23 in a state in which the magnets 17 are respectively accommodated in the magnet housing holes 15, and the core 13 is supported by the support members 24. Thereafter, the core 13 in the above-described state is clamped by the first die 22 and the second die 23. Accordingly, the branch passages 36 of the gate plate 33 are connected to the magnet housing holes 15 of the core 13 at the injection ports 37.

Injection Step

As shown in FIG. 4, in the injection step, the plastic 18 in a molten state is supplied to each branch passage 36 from the cylinder (not shown). Accordingly, the plastic 18 in a molten state flows through the branch passages 36 and is injected into the magnet housing holes 15 through the injection ports 37 and the upper end openings 35 of the magnet housing holes 15. That is, in the injection step, the plastic 18, in a molten state, is injected into the magnet housing holes 15 of the core 13, in a state in which the first die 22 and the second die 23 are clamped in the die clamping step.

At this time, the dimension in the width direction of the gap 20 in each magnet housing hole 15 is less than or equal to 0.45 mm. The plastic 18 in a molten state of a relatively high viscosity does not substantially flow into the gap 20, which is less than or equal to 0.45 mm in dimension. Thus, as shown in FIGS. 2 and 3, the plastic 18 in a molten state injected into each magnet housing hole 15 fills parts of the magnet housing hole 15 that are closer to the opposite ends in the lengthwise direction than the magnet 17 and a part of the magnet housing hole 15 that is above the magnet 17.

However, the plastic 18 in a molten state does not fill the gap 20 in each magnet housing hole 15. Specifically, although the plastic 18 enters slightly in the upper end portion of the gap 20 in the magnet housing hole 15, the plastic 18 does not enter at all into regions other than the upper end portion of the gaps 20. Thus, the regions other than the upper end portion of the gap 20 in the magnet housing hole 15 are non-filled regions, which are not filled with the plastic 18 in a molten state. The plastic 18 is then cooled and solidifies in the magnet housing hole 15, so that the magnet 17 is fixed in the magnet housing hole 15. The rotor 11 shown in FIG. 1 is thus manufactured.

Removal Step

In the removal step, the first die 22 and the second die 23 are opened to remove the rotor 11 from the manufacturing apparatus 21. After the rotor 11, which is supported by the support member 24, is removed from the space between the first die 22 and the second die 23, the rotor 11 is detached from the support member 24. The rotor 11 shown in FIG. 1 is thus obtained.

Operation of Embodiment

When each magnet 17 is accommodated in the corresponding magnet housing hole 15, the gap 20 is formed between the first inner surface 15A of the magnet housing hole 15 (the elongated hole portion 19) and the first side surface 17A of the magnet 17 accommodated in the magnet housing hole 15 (the elongated hole portion 19), or between the second inner surface 15B of the magnet housing hole 15 (the elongated hole portion 19) and the second side surface 17B of the magnet 17 accommodated in the magnet housing hole 15 (the elongated hole portion 19), or both between the first inner surface 15A of the magnet housing hole 15 (the elongated hole portion 19) and the first side surface 17A of the magnet 17 accommodated in the magnet housing hole 15 (the elongated hole portion 19) and between the second inner surface 15B of the magnet housing hole 15 (the elongated hole portion 19) and the second side surface 17B of the magnet 17 accommodated in the magnet housing hole 15 (the elongated hole portion 19). In these cases, the dimension in the width direction of the gap 20 is less than or equal to 0.45 mm. Thus, even if the plastic 18, which is thermoplastic in a molten state of a relatively high viscosity, is injected into the magnet housing hole 15, the plastic 18 does not substantially flow into the gap 20.

Thus, non-filled regions, which are not filled with the plastic 18, are automatically formed between the first inner surface 15A of the magnet housing hole 15 (the elongated hole portion 19) and the first side surface 17A of the magnet 17 accommodated in the magnet housing hole 15 (the elongated hole portion 19), or between the second inner surface 15B of the magnet housing hole 15 (the elongated hole portion 19) and the second side surface 17B of the magnet 17 accommodated in the magnet housing hole 15 (the elongated hole portion 19), or both between the first inner surface 15A of the magnet housing hole 15 (the elongated hole portion 19) and the first side surface 17A of the magnet 17 accommodated in the magnet housing hole 15 (the elongated hole portion 19) and between the second inner surface 15B of the magnet housing hole 15 (the elongated hole portion 19) and the second side surface 17B of the magnet 17 accommodated in the magnet housing hole 15 (the elongated hole portion 19). The non-filled regions can function as passages through which a cooling medium (for example, cooling oil) for cooling the magnets 17 flows. Since the magnets 17 are directly cooled by the cooling medium, the cooling performance of the magnets 17 is improved. This facilitates the manufacture of the rotor 11 that increases the cooling performance of the magnets 17.

Advantages of Embodiment

The above-described embodiment has the following advantages.

(1) In the method for manufacturing the rotor 11, the core 13, which includes the magnet housing holes 15, is arranged between the first die 22 and the second die 23, which are arranged to face each other. In the method for manufacturing the rotor 11, the magnets 17 are fixed by injecting the plastic 18, which is thermoplastic, into the magnet housing holes 15, which respectively accommodates the magnets 17. The magnet housing holes 15 extend through the core 13 in the axial direction of the core 13 and extend in a direction intersecting the radial direction of the core 13. Each magnet housing hole 15 and the corresponding magnet 17 are configured such that the difference between the dimension A in the width direction (a direction orthogonal to the lengthwise direction of the magnet housing hole 15) and the dimension B in the width direction of the magnet 17 accommodated in the magnet housing hole 15 is greater than 0 and less than or equal to 0.45 mm.

With the above-described method, the operation of the above-described embodiment facilitates the manufacture of the rotor 11, which increases the cooling performance of the magnets 17.

(2) The rotor 11 includes the core 13 and the magnets 17. The core 13 includes the magnet housing holes 15. The magnets 17 are fixed with the plastic 18, which is thermoplastic, in a state in which the magnets 17 are respectively accommodated in the magnet housing holes 15. The magnet housing holes 15 extend through the core 13 in the axial direction of the core 13 and extend in a direction intersecting the radial direction of the core 13. In each magnet housing hole 15, the gap 20 is formed between the first inner surface 15A of the magnet housing hole 15 and the first side surface 17A of the magnet 17 accommodated in the magnet housing hole 15, or between the second inner surface 15B of the magnet housing hole 15 and the second side surface 17B of the magnet 17 accommodated in the magnet housing hole 15, or both between the first inner surface 15A of the magnet housing hole 15 and the first side surface 17A of the magnet 17 accommodated in the magnet housing hole 15 and between the second inner surface 15B of the magnet housing hole 15 and the second side surface 17B of the magnet 17 accommodated in the magnet housing hole 15.

The above-described configuration allows the gaps 20 to function as passages through which cooling medium for cooling the magnets 17 flows. Since the magnets 17 are directly cooled by the cooling medium, the cooling performance of the magnets 17 is improved.

(3) In the rotor 11, the gap 20 is formed between the first inner surface 15A of each magnet housing hole 15, which is on the side closer to the peripheral edge of the core 13 in the width direction, and the first side surface 17A of the magnet 17, which is on the side closer to the peripheral edge of the core 13 in the width direction.

With the above-described configuration, since the air layer in each gap 20 limits the transfer of heat from the stator (not shown), which is arranged on the radially outer side of the core 13, to the magnet 17, the temperature increase of the magnet 17 is limited.

Modifications

The above-described embodiment may be modified as follows. The above-described embodiment and the following modifications can be combined as long as the combined modifications remain technically consistent with each other.

As shown in FIG. 6, the gap 20 may be formed both between the first inner surface 15A of each magnet housing hole 15 and the first side surface 17A of the magnet 17 accommodated in the magnet housing hole 15 and between the second inner surface 15B of the magnet housing hole 15 and the second side surface 17B of the magnet 17 accommodated in the magnet housing hole 15. In this case, the cooling medium flows through the gaps 20, so that the magnet 17 is cooled by the cooling medium from the opposite sides in the width direction. This further improves the cooling performance of the magnets 17.

Figure 7:
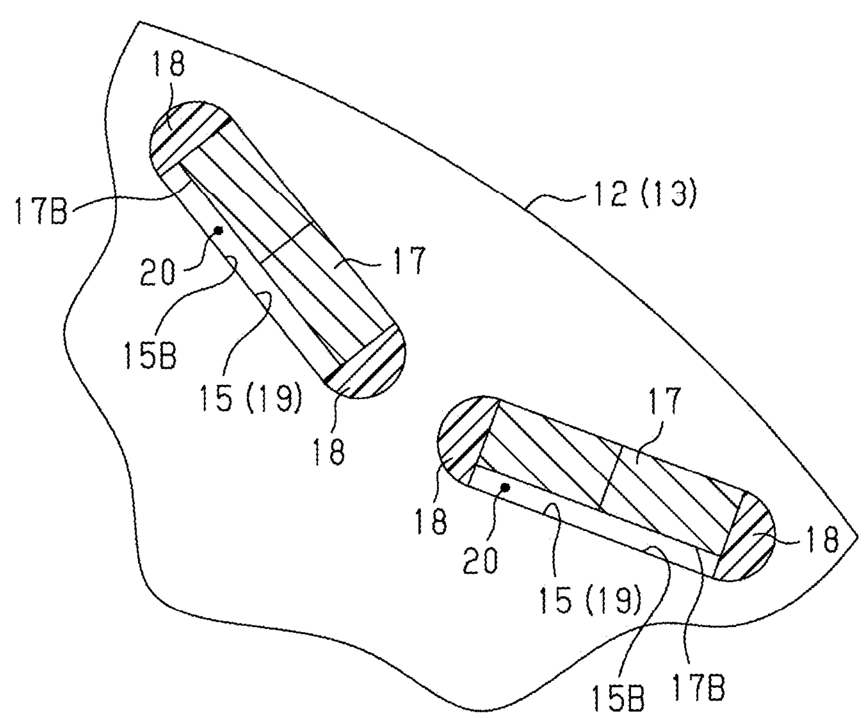
FIG. 7 is a cross-sectional view illustrating a part of a rotor according to another modification.

As shown in FIG. 7, the gap 20 may be formed only between the second inner surface 15B of each magnet housing hole 15, which is on the side opposite to the peripheral edge of the core 13 in the width direction, and the second side surface 17B of the corresponding magnet 17, which is on the side opposite to the peripheral edge of the core 13 in the width direction.

In the rotor 11, the gaps 20 formed in the magnet housing holes 15 may include gaps 20 of the configuration according to the above-described embodiment shown in FIG. 3, gaps 20 of the configuration shown in FIG. 6, and gaps 20 of the configuration shown in FIG. 7.

The magnet housing holes 15 may each include portions other than the elongated hole portion 19, which extends in a direction intersecting the radial direction of the core 13. As long as the magnet housing holes 15 each include the elongated hole portion 19, which extends in a direction intersecting the radial direction of the core 13, the magnet housing hole 15 may include a portion that extends in the radial direction of the core 13.

As long as the magnet housing holes 15 each include at least part of the elongated hole portion 19, which extends in a direction intersecting the radial direction of the core 13, the magnet housing hole 15 may have a bent shape such as a V-shape or an L-shape.

The first die 22 and the second die 23 may be arranged to face each other in the horizontal direction.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A method for manufacturing a rotor, wherein a rotor is manufactured by injecting thermoplastic into each of magnet housing holes in a core with a magnet accommodated in each magnet housing hole, thereby fixing the magnets, the method comprising:

preparing the core and the magnets, the core including the magnet housing holes, wherein each of the magnet housing holes extends through the core in an axial direction of the core and includes an elongated hole portion that extends in a direction intersecting a radial direction of the core, and the elongated hole portion and the magnet are configured such that a difference between a dimension in a width direction, which is a direction orthogonal to a lengthwise direction of the elongated hole portion, and a dimension, in the width direction of the magnet when accommodated in the elongated hole portion, is greater than 0 and less than or equal to 0.45 mm;

accommodating the magnets in the elongated hole portions of the magnet housing holes;

clamping the core between a first die and a second die in a state in which the magnets are accommodated in the elongated hole portions of the magnet housing holes; and injecting the thermoplastic into the magnet housing holes of the core clamped between the first die and the second die, wherein each elongated hole portion includes two inner surfaces on opposite sides in the width direction, one of the inner surfaces closer to a peripheral edge of the core being defined as a first inner surface, and the other inner surface, farther from the peripheral edge of the core, being defined as a second inner surface, the magnet accommodated in each elongated hole portion includes two side surfaces on opposite sides in the width direction, one of the side surfaces closer to the peripheral edge of the core being defined as a first side surface, and the other side surface, farther from the peripheral edge of the core, being defined as a second side surface, the accommodating the magnets in the elongated hole portions of the magnet housing holes includes accommodating the magnets in the elongated hole portions of the magnet housing holes such that, in each of the elongated hole portion, a gap is formed between the first inner surface of the elongated hole portion and the first side surface of the magnet accommodated in the elongated hole portion, or between the second inner surface of the elongated hole portion and the second side surface of the magnet accommodated in the elongated hole portion, or both between the first inner surface of the elongated hole portion and the first side surface of the magnet accommodated in the elongated hole portion and between the second inner surface of the elongated hole portion and the second side surface of the magnet accommodated in the elongated hole portion, the gap includes an upper end portion and a portion other than the upper end portion, and the injecting the thermoplastic into the magnet housing holes of the core clamped between the first die and the second die includes injecting the thermoplastic into the magnet housing holes so that the thermoplastic is not filled in the portion of the gap other than the upper end portion.

2. The method for manufacturing a rotor according to claim 1, wherein the injecting the thermoplastic into the magnet housing holes of the core clamped between the first die and the second die includes injecting the thermoplastic into the magnet housing holes so that the thermoplastic is filled in the upper end portion of the gap.

3. A rotor, comprising:

a core including magnet housing holes; and magnets that are fixed with thermoplastic in a state in which the magnets are respectively accommodated in the magnet housing holes, wherein each of the magnet housing holes extends through the core in an axial direction of the core and includes an elongated hole portion that extends in a direction intersecting a radial direction of the core, a direction orthogonal to a lengthwise direction of each elongated hole portion is defined as a width direction, each elongated hole portion includes two inner surfaces on opposite sides in the width direction, one of the inner surfaces closer to a peripheral edge of the core being defined as a first inner surface, and the other inner surface, farther from the peripheral edge of the core, being defined as a second inner surface, the magnet accommodated in each elongated hole portion includes two side surfaces on opposite sides in the width direction, one of the side surfaces closer to the peripheral edge of the core being defined as a first side surface, and the other side surface, farther from the peripheral edge of the core, being defined as a second side surface, in each of the elongated hole portion, a gap is formed between the first inner surface of the elongated hole portion and the first side surface of the magnet accommodated in the elongated hole portion, or between the second inner surface of the elongated hole portion and the second side surface of the magnet accommodated in the elongated hole portion, or both between the first inner surface of the elongated hole portion and the first side surface of the magnet accommodated in the elongated hole portion and between the second inner surface of the elongated hole portion and the second side surface of the magnet accommodated in the elongated hole portion, the elongated hole portion and the magnet are configured such that a difference between a dimension in a width direction, which is a direction orthogonal to a lengthwise direction of the elongated hole portion, and a dimension, in the width direction of the magnet when accommodated in the elongated hole portion, is greater than 0 and less than or equal to 0.45 mm, the gap includes an upper end portion and a portion other than the upper end portion, and the thermoplastic is not filled in the portion of the gap other than the upper end portion.

4. The rotor according to claim 3, wherein, in each elongated hole portion, the gap is formed between the first inner surface of the elongated hole portion and the first side surface of the magnet accommodated in the elongated hole portion.

5. The rotor according to claim 3, wherein the thermoplastic is filled in the upper end portion of the gap.

* * * * *